Jan. 28, 1958 J. R. WATT ET AL 2,821,070
ICE MAKING MACHINE AND STORING APPARATUS
Filed Sept. 7, 1954 6 Sheets-Sheet 5

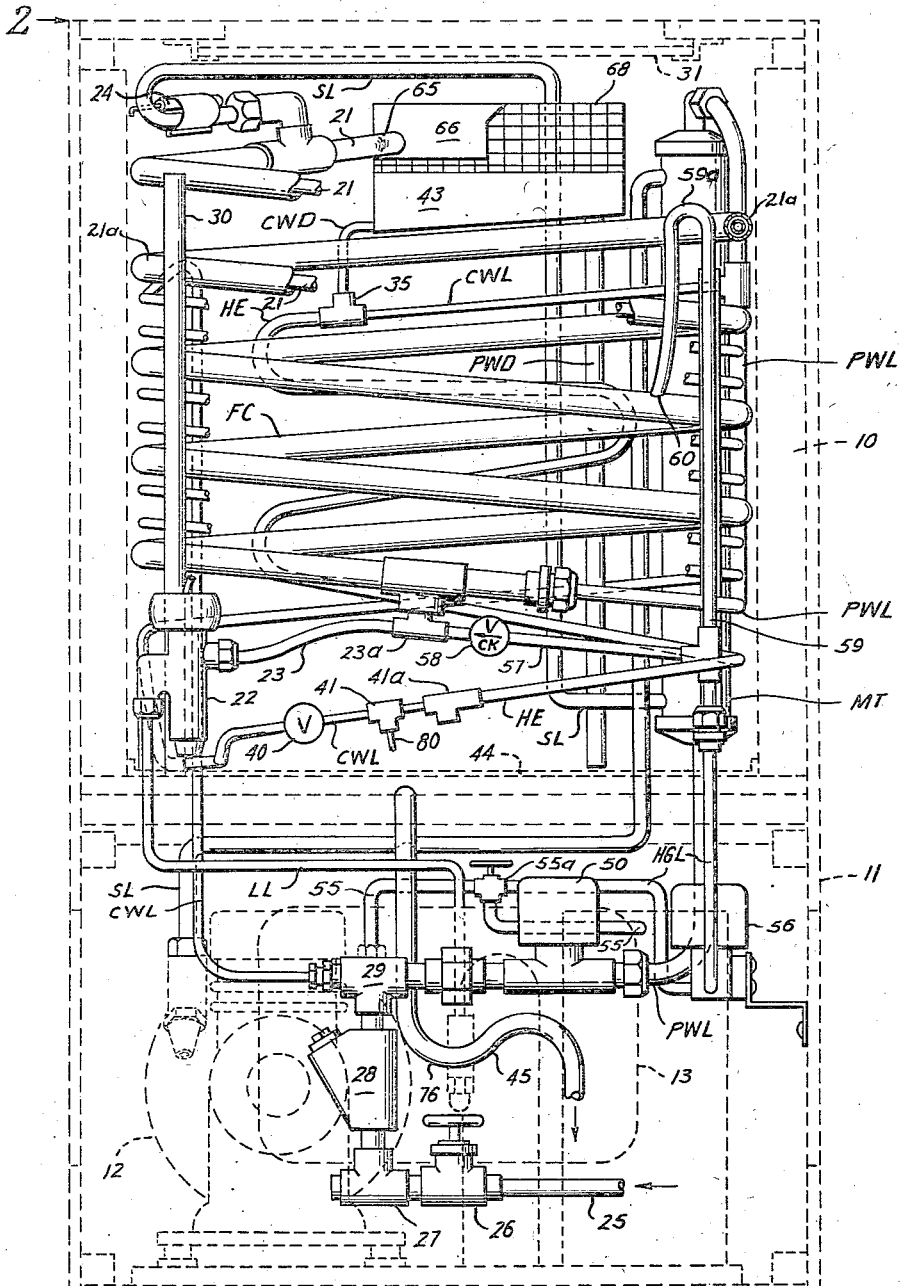

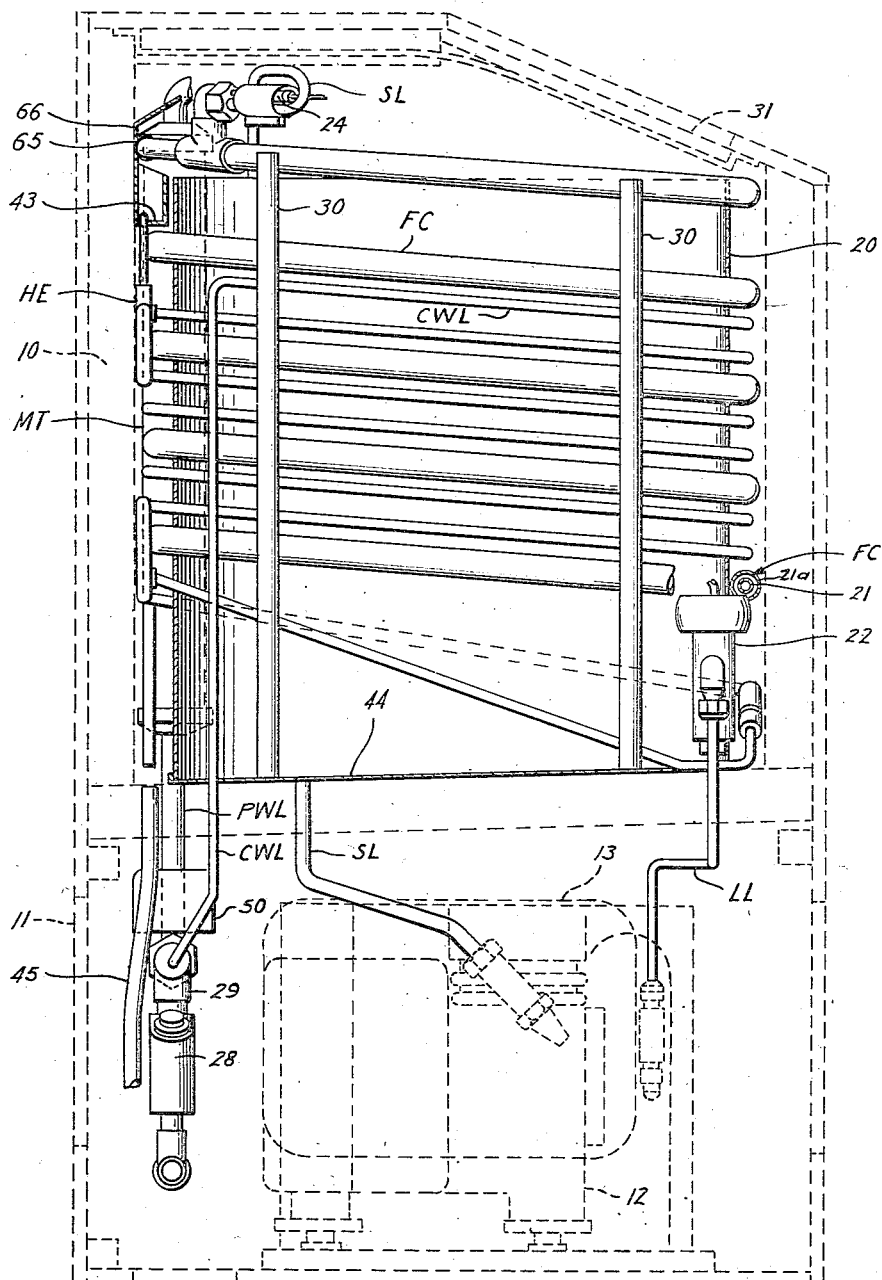

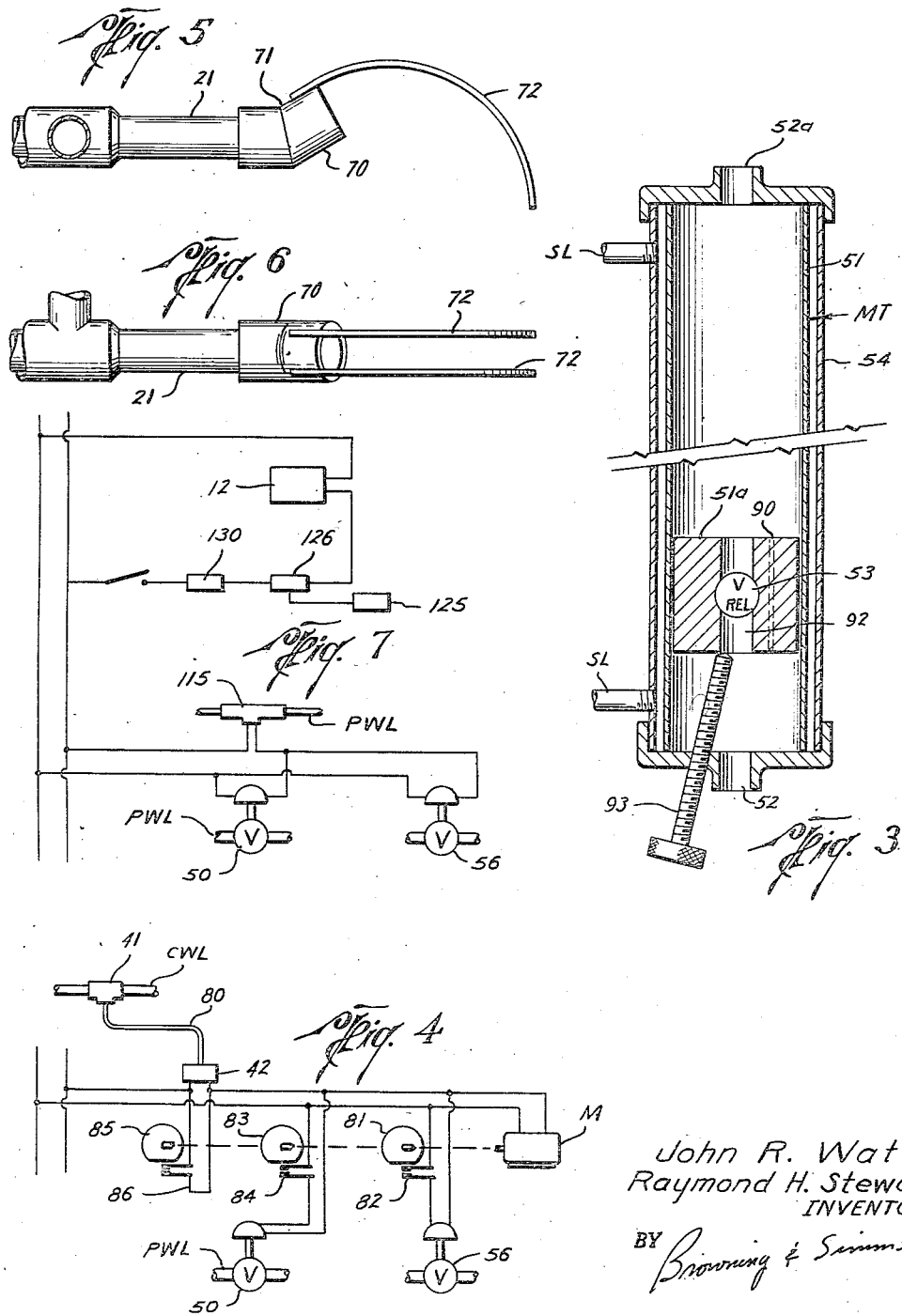

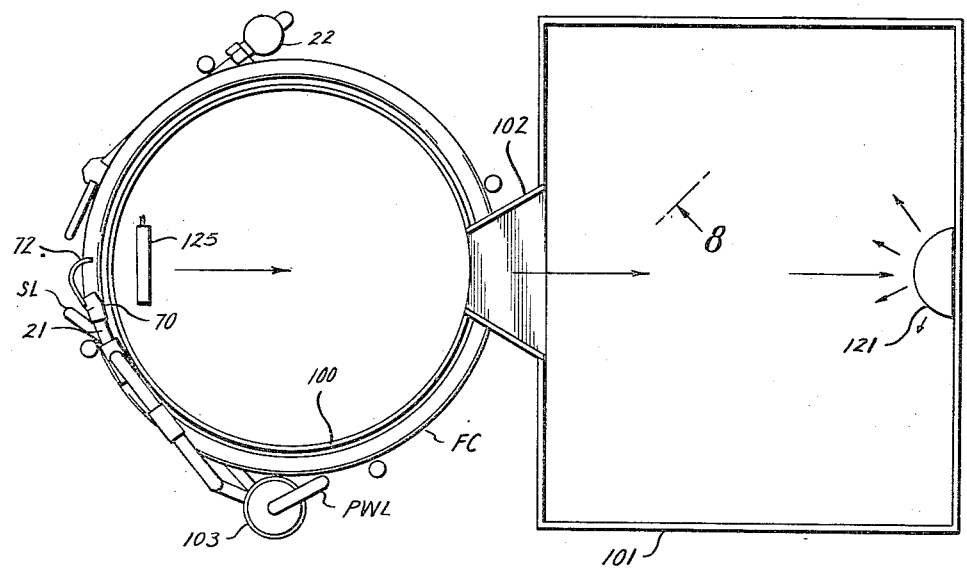
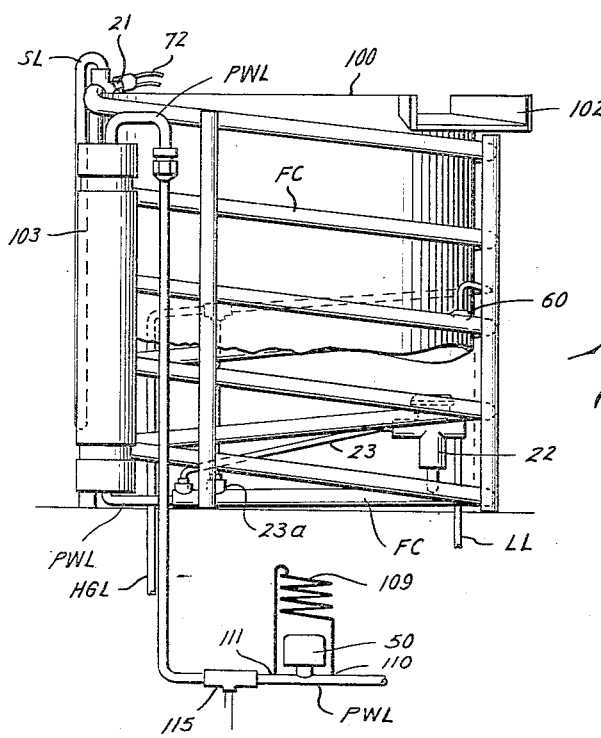

JOHN R. WATT
RAYMOND H. STEWART INVENTORS

BY Browning, Simms & Hoyer

ATTORNEYS

United States Patent Office 2,821,070
Patented Jan. 28, 1958

2,821,070

ICE MAKING MACHINE AND STORING APPARATUS

John R. Watt and Raymond H. Stewart, Austin, Tex., said Stewart assignor to said Watt Application September 7, 1954, Serial No. 454,354

25 Claims. (Cl. 62—7)

This invention relates to apparatus for freezing liquids and more particularly to apparatus for making and storing ice in small pieces or cubes.

It has heretofore been customary to make such small pieces or cubes of ice by machines having a nest of vertical freezing tubes from which the frozen ice rods are directed against breaker plates for breaking the ice rods into small pieces. Machines of this type are shown in the patents to Gruner 2,397,347, Kubaugh 2,453,140, Grandia 2,593,870, and Lee et al. 2,597,008.

Tubes which discharge the ice rods by gravity must be located entirely above the storage bins which they fill. To conserve height most manufacturers thus provide either abnormally short freezing tubes or inconveniently low and shallow storage bins. Where short tubes are used, a greater number of them are required thus making manufacture more complicated and expensive. Also, the low storage bins are inconvenient to the user who is usually an employee of a drug store, restaurant, or other commercial establishment using large quantities of ice.

One important feature of this invention is the provision of an ice making machine incorporating a curved or coiled freezing tube along with other elements in such a manner that there is a great gain in compactness and simplicity. The output of a single freezing tube per cycle is governed by its length and its internal volume or water capacity. Since the internal diameter of a round tube or the cross section of a square one is fixed by the size of the ice pieces desired, output per cycle depends upon the length and the number of the tubes. Thus, in typical ice-cube making machines, adequate output now requires a tall machine containing a multiplicity of parallel tubes. The latter feature adds to the complexity and cost of the machines.

However, it has been found that a single tube may be bent into a uniform helical coil, like a spring, which thus fits perhaps 50 feet of freezing tube into a height of only a relatively few inches. This tube, with a refrigerant jacket surrounding it, makes an admirable coil about the very ice-storage bin into which it deposits ice and allows construction of complete machines only two to four feet tall, complete with compressor and controls in the base. This tube can extend below as well as above the storage bin and thus does not require the making of an ice machine of an inconvenient height. While the single tube machine is preferred because it is less expensive to construct than a multiple tube machine and also requires a simpler set of controls, it will be recognized that the same compactness may be realized by the use of a plurality of coiled tubes.

Compactness is a great sales feature because the biggest market for such machines is in restaurants, drug stores, etc., where space is at a premium and new equipment must fit under counters or match in height the standard items of that trade.

An important object of this invention is to provide an ice making machine embodying a curved or coiled freezing tube for freezing liquids so that the machine can be made very compact and can have relatively few parts and controls.

Another object is to provide an ice-storage bin having at least one freezing tube coiled around it so that the freezing tube cannot only produce ice but also preserve the same after it has been deposited in the bin.

Another object is to provide an ice making machine having a coiled freezing tube and means for controllably supplying city water pressure to the tube not only to recharge the tube but also to discharge the ice from the tube after it has been frozen.

Another object is to provide an ice making machine having a freezing tube and means for supplying a predetermined volume of water to the tube.

Another object is to provide novel means for breaking an ice rod formed in an ice making machine into ice cubes. The term ice cube as used herein is intended to include small pieces of ice of any shape, whether the cross section is round, rectangular, or of other form.

Another object is to provide means for drying the ice cubes of an ice making machine of the type described.

Another object is to provide novel means for circulating a continuous trickle of water through the freezing tube of an ice making machine without the use of a motor, pump or needle valves.

Another object is to provide for the circulation of a small quantity of water through the freezing tube in such a manner that though such circulation normally maintains a small longitudinal hole through a major portion of the length of the ice rod being formed, a part of such rod length is permitted to freeze solid thereby providing, in effect, a piston for a pressure fluid to act against in ejecting the ice rod from the freezing tube without excessive wastage of such fluid by flow through said hole in the rod.

Another object is to provide means, responsive to an increase in pressure in the circulating water system of an ice making machine, for initiating the harvesting of the ice and refilling a freezing tube in the machine with water to be frozen.

Another object is to provide an arrangement of one or more ice-storage bins in combination with an efficient simple means for delivering ice ejected from a freezing tube into such bins, the delivery means functioning to deposit ice in a bin remote from the discharge end of the freezing tube even when the ice is ejected at a relatively low velocity as, for example, when ejected by the application of water available at only a low pressure.

Another object is to provide a plurality of ice-storage bins at least one of which has an ice making tube coiled around it in combination with means for filling the bins with ice cubes.

Another object is to provide a plurality of ice-storage bins having means for filling them and means for shutting off the ice making machine when the ice in said bins reaches a predetermined level.

Other objects, advantages and features of this invention will be apparent to one skilled in the art upon a consideration of the written specification, the appended claims, and the attached drawings wherein:

Fig. 1 is a front view of an ice making and storing apparatus embodying this invention, with certain parts cut away for clarity, and the usual box and other appurtenances shown in phantom;

Fig. 2 is a side view taken along lines 2—2 of Fig. 1;

Fig. 3 is an enlarged view, partly in section, of the metering tank of Figs. 1 and 2;

Fig. 4 is a schematic diagram of a circuit for controlling the cycle of operation of the apparatus of Figs. 1 and 2;

Fig. 5 is an enlarged fragmentary view of the upper portion of the freezing tube showing the ice breaker and ice cube guide members;

Fig. 6 is a side view of the structure shown in Fig. 5;

Fig. 7 is a schematic diagram of an alternative control circuit;

Fig. 8 is a front view, taken along lines 8—8 of Fig. 9, of a portion of another form of the ice making and storing apparatus embodying this invention;

Fig. 9 is a plan view of the structure shown in Fig. 8 including an auxiliary ice-storage bin;

Figure 10:
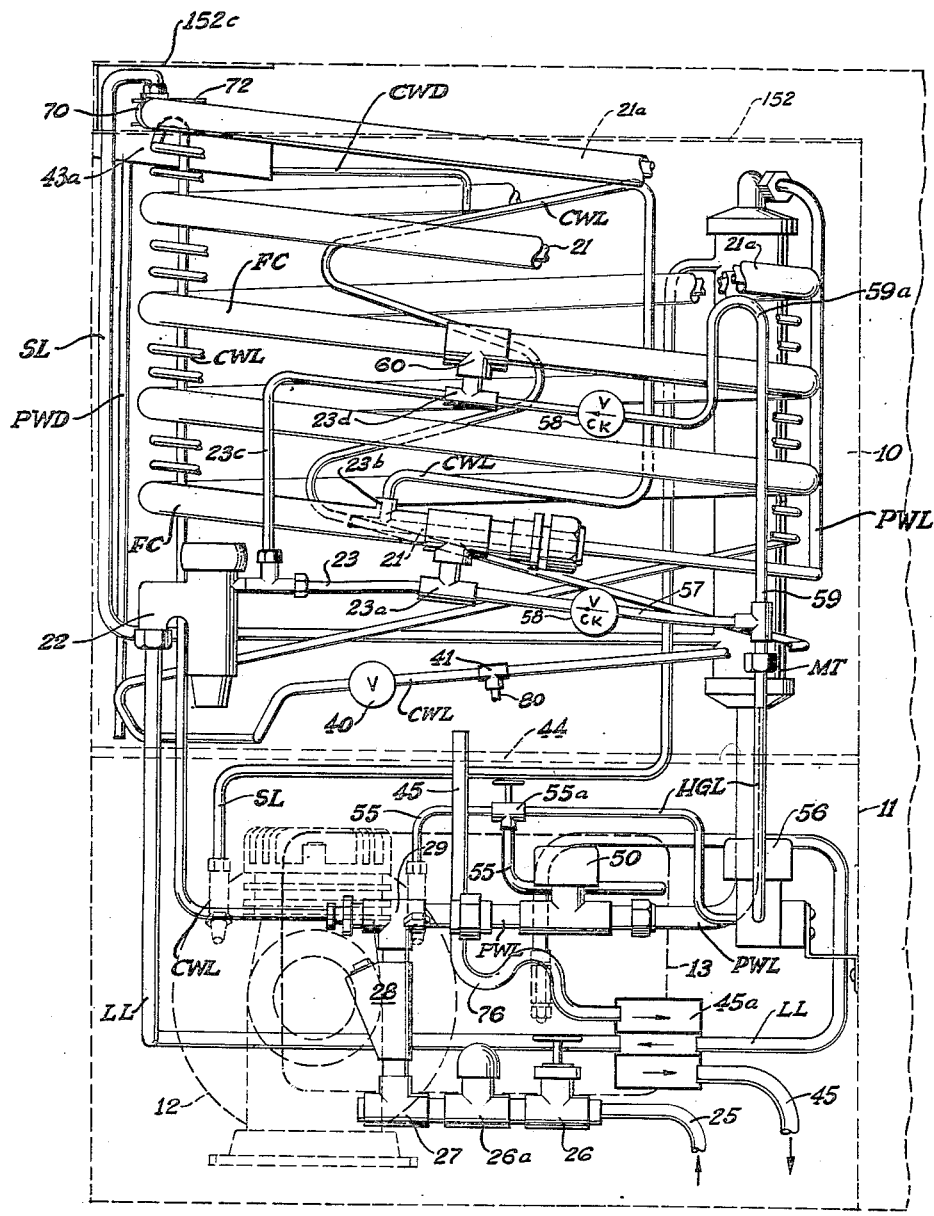
Figure 11:
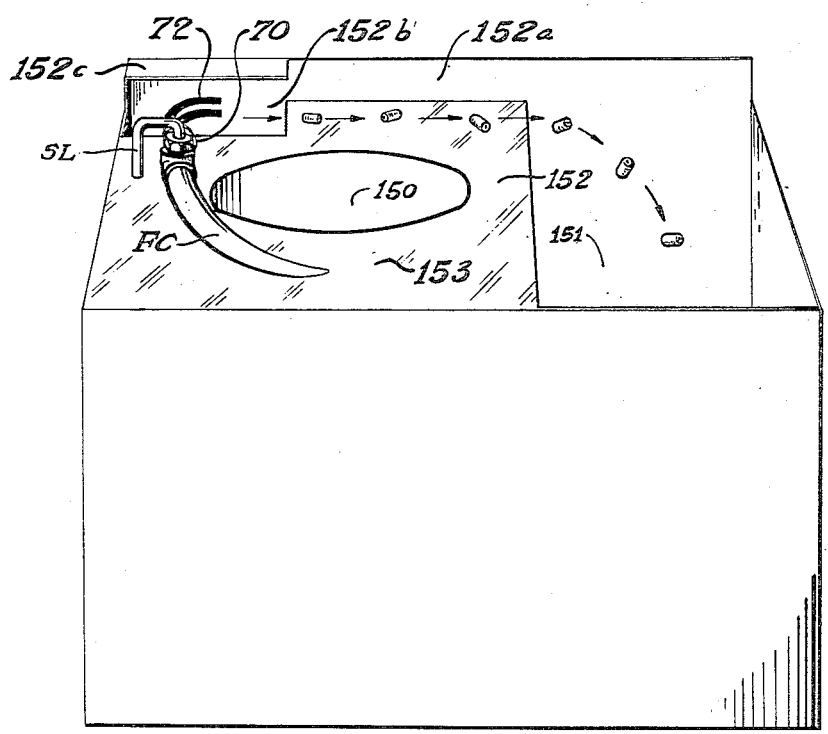

Fig. 10 is a view similar to Fig. 1 except that it shows a modified and more preferred form of ice making and storing apparatus having certain improved features not found in the apparatus of Fig. 1; and Fig. 11 is a perspective view of the embodiment of Fig. 10 illustrating an improved arrangement for filling an ice-storage bin arranged inside the freezing coil of Fig. 10 and also an auxiliary bin, neither of the bins being shown in Fig. 10 for the sake of clarity.

The ice making machine of this invention includes a coiled freezing tube for receiving liquid to be frozen, and a refrigerating means for freezing such liquid. Two different systems, called the pressure water system and the circulating water system, supply the freezing tube with water taken from a city water line under normal pressure, usually 60 p. s. i. or more but which can be as low as 10 p. s. i., for example, particularly when the embodiment of Figs. 10 and 11 is employed. A hot gas system is provided as defrosting means for freeing the rod of frozen liquid from the interior of the coiled freezing tube.

Referring more particularly to the drawings, Figs. 1 to 3 show one form of the ice making mechanism embodying certain features of the invention. An insulated box 10 is supported in the upper portion of a main frame 11, while a compressor 12 and a condenser 13 are housed in the lower portion of frame 11.

An ice-storage bin shown at 20 in Fig. 2 is mounted in box 10 and has a freezing tube 21 coiled around it. Means are provided for refrigerating this tube including an outer tube 21a jacketing tube 20, the resulting freezing coil FC being supported on four spacers 30. Compressor 12 pumps refrigerant through condenser 13 into liquid line LL from which it passes through an expansion valve 22 and thence into an evaporator feed line 23. The latter is connected via T 23a into jacket 21a around freezing tube 21. In passing upward through the jacket, the refrigerant absorbs heat from water in freezing tube 21 and is at least partially evaporated. The spent refrigerant is returned to compressor 12 through a suction line SL connected to jacket 21a at the upper end of the freezing coil FC. The expansion valve 22 can be controlled by the temperature of the refrigerant in the suction line SL by means of a feeler bulb 24 clamped on line SL, and thus the refrigerant enters the jacket in proportion to the need for it.

It will also be noted from Fig. 10 that the cold refrigerant from expansion valve 22 can be divided into two portions, one flowing into jacket 21a through T 23a situated near the entrance (lower) end of the freezing tube and the other portion flowing into the jacket via line 23c and T 23d situated intermediate (e. g. approximately halfway) the ends of jacket 21a. This type of arrangement is particularly advantageous when freezing tube 21 is quite long and provides for faster freezing. The two lines 23 and 23c can be fed from a single expansion valve 22 as shown or a separate expansion valve provided for each line. It may be noted that valve 22 is illustrated in Fig. 10 as an automatic expansion valve instead of the thermostatic type shown in Fig. 1.

All water enters the machine through a line 25 which can be connected to a city water system and passes through a shut-off valve 26 into a T 27, one outlet of which is plugged. This plugged outlet is provided for the occasions when a valve or faucet for filling drinking glasses is to be mounted on the mechanism. The water then passes through a strainer 28 and thence into another T 29 where it divides to flow into the pressure water line PWL and the circulating water line CWL. As shown in Fig. 10, a constant flow valve 26a can be installed in the water inlet and is of the type which allows a predetermined gallonage of water to flow through the inlet irrespective of substantial fluctuations of the supply pressure. This greatly improves the uniformity of operation of the ice making machine where water pressures are variable.

The freezing tube 21 may be formed with its loops spread out or closely coiled together. The chief requirement is that the freezing tube be so formed that a coil of ice formed therein may be readily removed therefrom. To this end, it is preferable that the tube have a substantially uniform curvature at all points, and that the cross section be substantially uniform throughout or that it be of slightly increasing cross section in the direction of ice movement, but not of decreasing cross section in such direction. Also the inner surface of the freezing tube should be smooth and substantially free from dents and irregularities. It will be understood that tube 21 can have some variation in its curvature but excessive variation will result in difficulty in ejecting the ice or in having to melt considerable quantities of the ice before the same can be ejected.

*Circulating water system*

While the water in freezing tube 21 is being frozen, it will expand. If the rod of ice in this tube is permitted to freeze into a solid mass, the resulting expansion may well rupture the ice tube or at least deform it in such a manner that ejection of ice from the tube will be difficult thereafter. To prevent this, a small central longitudinal hole is preserved in the ice rod by circulating a small amount of water through the freezing tube during the freezing part of the cycle. The circulating water also carries away dissolved minerals and gases rejected by the water being frozen and the resulting agitation and washing action of the circulating water results in a purer ice than would result if such water were not circulated.

As stated above, water from line 25 is divided at T 29 and one stream from this T comprises the supply for the circulating water system. Thus the circulating water passes upward from T 29 through a small circulating water line CWL which has a portion of its length disposed in heat exchange relationship with jacket 21a as by coiling around bin 20 with loops of line CWL being disposed intermediate the loops of freezing coil FC. The loops of the circulating water line may be supported by the same spacers 30 as support the freezing coil FC.

Since freezing coil FC is enclosed in insulated box 10, open only through a sliding panel 31 at the top, the air within the box is cool and usually averages between 30° and 40° F. in temperature. Hence the small trickle of water in the circulating water line CWL is cooled as it passes through the entire length of the coil which may be 25–30 feet. This cooling is best termed "pre-cooling" because the water is cooled to perhaps about 40° F.

After traversing the circulating water line coils described above, the circulating water passes through a needle valve 40 which allows adjustment of its rate of flow. Then it passes through a T 41, from which a line 80 branches off to a pressure switch 42 (Fig. 4) down near the condensing unit, and through another T 41a. Then the water enters the heat exchanger HE which further cools it to 32° or 33° F.

The heat exchanger HE includes two concentric tubes extending upwardly from the T 41a, the inner tube being an extension of water line CWL and the outer tube forming a jacket around the inner tube. As the circulating water passes upward in the inner tube, it is cooled by colder water which may be derived from a source described below.

After chilled circulating water leaves heat exchanger

HE at the upper end, it passes through a short length of line CWL and enters the pressure water line PWL which leads to the lower end of the freezing tube 21 of the freezing coil. This flow of water into tube 21 displaces a like amount of water therefrom and the displaced water falls from the upper end of tube 21 into a collector pan 43. Since this displaced water is largely circulating water which was pre-cooled and then passed through the entire length of the freezing coil FC, where some of it was frozen, it is very cold and can serve to further cool the warmer circulating water passing through the heat exchanger HE. Accordingly, it is drained through the circulating water drain, CWD, into the upper end of heat exchanger jacket HE through a T 35. Moving downward this displaced water surrounds the small CWL and completes the pre-cooling of new circulating water entering the system. Then the thus warmed displaced water discharges from heat exchanger HE through the stem of the tee 41a at the lower end in front, near circulating water valve 40. This juxtaposition allows easy visual adjustment of the water flow when installing or servicing the machine. The waste water flows to the rear of the floor pan 44 and enters a drain 45 which also collects meltage from the stored ice. As shown in Fig. 10, a heat exchanger 45a can be employed to pre-cool the hot liquid refrigerant flowing through LL to expansion valve 22. This heat exchanger may be installed in the drain line 45 so that the cooling medium is the waste water from the entire system including discharged circulating water, any excess pressure water from the freezing coil and meltage from the ice-storage bin or bins.

In addition to the functions of the circulating water system as set out above, it also provides an accurate means for timing and pacing the productive cycle. As noted earlier, a branch line 80 from the circulating water line is connected to a pressure switch 42 (Fig. 4). So long as the circulating water flows freely through the freezing coil, the pressure transmitted to the pressure switch is low and does not actuate it. However, when the freezing tube is frozen nearly solid with ice and the central hole is small, the pressure of the circulating water increases and operates the switch 42, usually at about 25 p. s. i. pressure. Pressure switch 42 closes a circuit to energize a timing motor M which in turn opens electrically the hot gas defrosting system and the pressure water system to loosen and discharge the ice. Shortly thereafter, the timing motor shuts off the hot gas and pressure water and the machine resumes the remainder of its freezing cycle when only the circulating water is flowing.

A more preferred form of a circulating water system is illustrated in Fig. 10 from which it will be noted that the more preferred system has several features in common with that shown in Fig. 1. However, an important and substantial difference is that the system of Fig. 10 permits a solid "piston" of ice to be formed as a fractional part of the length of the ice rod so that upon upon the application of pressure water to one end of the ice rod to eject it from the freezing tube, such water is prevented from flowing through the central hole in the rod during ejection. This not only conserves water but, more important, it permits full supply pressure to act to eject the ice rod and avoids pressure water flowing through the central hole in the ice rod to squirt out the exit end of the freezing tube. Thus, the circulating water enters the freezing tube FC at a point adjacent but spaced downstream from both the points of entry of the cold refrigerant and the pressure water. As shown in Fig. 10, the circulating water is introduced through a fitting 23b into freezing tube 21 a few inches (e. g. 2 to 3) from the evaporator feed line T 23a so that a portion of freezer tube length near its entrance is not traversed by the circulating water but which is refrigerated so that a solid plug or "piston" of ice can form without any central hole therethrough. Downstream of the circulating water fitting 23b, circulating water does flow slowly through the freezing tube to cause a central hole to extend through the remaining length of the ice rod. The spacing of the circulating water connection from the entrance end of the freezing tube should be such that the solid piston of ice can form in sufficient length to withstand the pressure of the water supply during ejection of the ice rod and yet not so great that the freezing of such piston is apt to cause the freezing tube to be ruptured or deformed. When employing this feature, the pressure water can act on the end of the solid ice piston to push the ice rod from the freezing tube without appreciable leakage of water, with a minimum drop in water pressure acting on the ice rod and without excessive melting of the ice rod by water flowing through the same.

Another difference in the arrangement of Fig. 10 from that of Fig. 1 is that the heat exchanger HE for pre-cooling the circulating water has been modified by eliminating the jacket around the circulating water line and permitting the cold water from pan 43a to drip onto the circulating line CWL from drain CWD and then to flow downwardly along and on the line to cool the circulating water flowing countercurrently therein. The circulating water is, of course, further cooled by the cold air in the insulated cabinet. Also, the circulating water line CWL can be disposed in any desired manner to facilitate flow of the cold water along its length.

In other respects, the circulating water system of Fig. 10 is like that of Fig. 1 including the provision of pressure switch 42 for the above-described purpose.

In the use of circulating water flowing through freezing tube of the apparatus, it should be noted no pump is needed, and that the water flow is small enough to be wasted (about 4 oz. of water per minute). Little refrigeration is lost, because the water is discharged only after it has pre-cooled the incoming circulating water. In addition to the advantage of eliminating a pump and motor with their attendant service troubles, the above-described system of circuating water causes minerals rejected by the freezing water to be carried away as fast as they precipitate out. No concentration of minerals is built up, as in other designs, and hence little scaling or concentration of impurities on the freezing surface should occur. In other machines, fouling of the freezing surfaces prevents release of the ice and causes ruptures and warping as well as clogging and pump troubles.

*The pressure water system*

The pressure water system begins at the T 29 above the strainer 28 and includes a pressure water solenoid valve 50, which is normally closed in the pressure water line PWL. From this solenoid valve 50, the pressure water line PWL extends upward to connect with the bottom of metering tank MT. From a connection at the top of tank MT the pressure water line PWL extends to connect with the lower end of freezing tube 21.

The metering tank MT serves two functions. First, when the pressure water solenoid valve 50 is opened by the electric timing motor M which controls it, the metering tank allows only enough pressure water to enter freezing tube 21 to discharge the ice and refill the tube with water. When a volume adequate for these purposes has passed through the metering tank, flow is shut off by the tank even though solenoid valve 50 may still be open.

Referring to Fig. 3, the metering tank MT may be a vertical hollow cylinder or chamber 51 through which the pressure water must pass from an inlet 52 to an outlet 52a longitudinally spaced therefrom. A moderately tight fitting piston 51a normally rests in the lower end of chamber 51 but when solenoid valve 50 opens to admit pressure water through inlet 52, the water entering below piston 51a pushes it upward toward the top of the tank thereby causing the piston to push ahead of itself a measured volume of water. When this volume has been forced from the metering tank through outlet 52a, the piston has reached the end of the cylinder and closes outlet 52a thereby cutting off the flow.

Shortly afterward, the pressure water solenoid valve 50 closes again. Water will then seep past the piston to equalize the pressure on opposite ends thereof. Upon such equalization of pressure piston 51a settles slowly by gravity down to its original position in the bottom of the cylinder. Here it rests until water flow begins again.

Thus, the pressure water system provides a large free flow of water with which to push out the loosened ice rod. The flow is initiated by the solenoid valve 50 and endures only long enough to displace the ice from the freezing tube. Then the metering tank MT stops the flow, leaving freezing tube 21 refilled with fresh water ready for freezing.

A second purpose of the metering tank can be to precool the pressure water. The metering tank can be surrounded by a jacket 54 so refrigerant gases leaving freezing coil FC in line SL can be passed through the jacket on their way back to the condensing unit. This arrangement serves not only to pre-cool the pressure water, but the jacket also provides a surge chamber where liquid refrigerant forced from the freezing coil during the defrost cycle or at other times, will be trapped. This will prevent compressor damage which might occur if slugs of liquid entered the compressor cylinders ahead of the rapidly moving pistons.

Additional features of the metering tank MT may also be noted. As set forth above, piston 51a is freely suspended in moderately tight fitting relation within the metering tank cylinder to permit water to seep past the piston so that it can return to its initial position after a volume of water has been metered. An additional or alternative leak for the water may be a bore 90 through piston 51a. A pressure relief valve 53 connected across piston 51a, as by passage 92 through the piston, can be provided for the purpose of preventing water hammer. A spring-loaded ball valve is adequate for this purpose and its spring may be set to hold the valve closed while subjected to normal city water pressure. However, it is set to permit the valve to open when the moving water comes to a sudden stop when the piston reaches the top of the metering tank MT. During the occurrence of such high pressure, water is allowed to pass through the piston and out of the metering tank thereby relieving the pressure.

An adjustable stop in the form of a screw 93 can be provided to raise or lower the initial position of piston 51a and thereby adjust the volume of water to be supplied by the metering tank.

The hot gas system

Defrosting means are provided in the form of a hot gas system. The compressor 12 receives the vaporized refrigerant via the suction line SL and compresses it to a higher pressure, e. g. 100 lbs. per square inch or above. This compression heats the gas considerably. The condenser 13 then cools these vapors until they liquify and are ready to re-enter the freezing coil FC.

Since the gases leaving the compressor are relatively hot, they are admirable for defrosting service. The hot gases are tapped from line 55 between the compressor and condenser by means of a three-outlet hand valve 55a. A hot gas line HGL is connected to valve 55a and passes upwardly to branch into lines 57 and 59.

A hot gas solenoid 56 is disposed in line HGL and is normally closed. Valve 56 opens only when the frozen ice rod in freezing tube 21 is ready for discharge. Then the timing motor M energizes the circuit to open this valve and release the hot gases.

Line 57 is connected to freezing coil jacket 21a at the lower end thereof through T 23a. A check valve 58 allows hot gas to enter the jacket but prevents liquid refrigerant from entering the hot gas line when the valve 56 is closed.

Line 59 passes upwardly to include a looped portion 59a near the top of the machine and then doubles back down to approximately the center point 60 of jack 21a where it is connected to the jacket. Thus, the defrosting gases enter at two points into the jacket thereby greatly accelerating the defrosting action. The upward loop 59a of the hot gas line prevents liquid refrigerant entering the hot gas line during the freezing cycle.

While a certain hot gas defrosting means has been shown and described, other defrosting means may be used, e. g., passing electric current through the freezing tube wall to provide heat, or using tap water from the city water line.

The ice breaker and the separator pan

When the ice rod is frozen in tube 21, it is in the form of a helical rod. When tube 21 is defrosted and the rod loosened from the freezing tube, the pressure water entering one end of the tube pushes the rod longitudinally so that it unwinds itself from the tube and emerges from the upper end of the tube.

The freezing tube is wound with a uniform helix, but small errors here and there tend to bend the ice slightly as it spirals its way out. These discrepancies in the coil curvature thus break the brittle ice rod into many pieces, but not small enough for the service contemplated. Consequently, the ice breaker 65 may be placed at the outlet of the freezing tube 21. This ice breaker 65 is a means for breaking the ice rod into short pieces, e. g. one inch or shorter, and comprises a change in radius of bend of freezing tube 21 near its outlet end. This change in radius gives a sharper bend to the emerging ice and with proper design breaks it into cubes not over an inch long.

The ice breaker 65 further directs the stream of ice pieces against the rear metal panel 66 of the separator pan 43. In impinging on this and then on a diagonally placed screen 68, the ice pieces shed loose water clinging to them, such as may either be formed by the defrost action or which may be from circulating water unfrozen in the central hole in the ice rod. The ice pieces are deflected by the diagonal screen 68 and bounce down into the ice-storage bin 20. The water separated from the ice pieces falls into separator pan 43 and ordinarily drains out the circulating water drain CWD and into the heat exchanger HE.

Occasionally, some pressure water squirts past the ice rod in freezing tube 21. This is also caught in the separator pan 43. Since this water may be relatively warm and thus unsuited for the heat exchanger, a separate pressure water drain PWD is provided. The inlet to this drain is higher in the pan than the inlet to the circulating water drain, and hence drain PWD functions only when an unusual volume of water is caught in the pan.

An alternative form of ice breaking or deflecting means may be provided including a short length of tube 70, notched and bent sharply in the middle as at 71, with two curved parallel guide members or fingers 72 attached to the discharge end of the freezing tube 21 as shown in Figs. 5 and 6. The whole assembly is adapted to being slipped over the discharge end of the freezing tube 21 and fastened in place as by soldering.

With such arrangement, the ice pieces, which are wet externally due to the defrosting action and which may also contain some free water in their central hole, are deflected sharply as they slide along the curved guide members 72. Such a sharp change in direction of flow flings off much of the water on the ice pieces and such water is then caught in separator pan 43 adjacent to the discharge end of the freezing tube. This is true because the water tends to follow its original straight path as the ice pieces are directed laterally. The ice pieces are further dried since they are projected across the ice-storage bin to bounce from its opposite wall, and further moisture is flung off and runs down the wall.

As the last ice emerges from the freezing tube, any following gush of water passes through the guide members without deflection and falls into pan 43.

The floor pan 44 resting on the bottom of the insulated box 10 serves to collect waste water discharged from the heat exchanger HE, as well as condensation from the various elements of the ice making and storage apparatus and also any discharges from the pressure water drain PWD. The line 45 drains the floor pan 44 through a conventional trap 76. Trap 76 serves both to prevent cold air from draining out of the machine and to prevent sewer gas and hot air from entering the insulated box 10.

*Operation*

Assuming the freezing tube 21 is full of water, operation of the above-described apparatus is as follows: The condensing unit supplies liquid refrigerant to the freezing coil jacket and sucks away the evaporated refrigerant. Ice begins to form on the inner walls of the freezing tube.

Circulating water, pre-cooled both in the long coil within the cooled space and in heat exchanger HE, enters freezing tube 21 in a steady small stream, agitating the enclosed water slightly and preventing concentration of minerals as the freezing process forces them out of solution. The excess circulating water drips from ice breaker 65 into separator pan 43 and then enters the jacket of heat exchanger HE.

After a short period of time, ice within freezing tube 21 begins to restrict the free passage of circulating water. As such water flow is restricted, the pressure in the circulating water line CWL rises until it reaches a pre-determined level, say 25 lbs. per square inch. At such pressure, the water acts through a branch line 80 to actuate a pressure switch 42. This closes an electric circuit and starts electric timing motor M which in turn drives a cam 81 which closes switch 82. Closing of the switch 82 energizes and opens the hot gas solenoid valve 56 thereby starting the defrost action.

The hot gas enters the freezing coil jacket at two points and in a short while frees the ice rod from the freezing tube walls. In the meantime, timing motor M has also driven a cam 83 to close a switch 84. Closing of switch 84 energizes and opens pressure water solenoid valve 50 and full city water pressure is applied upon the bottom end of the ice rod. Hence the instant the ice rod is freed within the freezing tube, it starts to move and emerges from the upper end of the freezing tube where the ice breaker 65 breaks it into the desired pieces.

When all of the ice has thus been displaced, the metering tank stops the pressure water flow. Shortly thereafter, timing cams 81 and 83 open the circuits to solenoid valves 50 and 56 to energize them and permit the valves to return to their normally closed position. A third cam 85 driven by the motor M closes a circuit 86 connected in parallel with the pressure switch 42 at the same time switches 82 and 84 are closed. This parallel circuit 86 insures that the motor M will not be shut off by pressure or temperature changes in the freezing tube 21 until it has completed its full cycle.

This completes one cycle of operation of the ice making machine as the freezing tube is again filled with water and the freezing phase of the cycle is ready to repeat.

An alternative embodiment of the ice making mechanism of this invention, which is at present a preferred embodiment, may be seen in Figs. 7, 8 and 9. This embodiment is similar in many features to that already described and like features will be designated by the same reference numerals previously used. The present embodiment shows only the upper portion of the ice making and storing apparatus which is to be insulated in any convenient manner.

This upper portion includes an ice-storage bin 100 having a jacketed freezing tube 21, constructed in the same manner as coil FC in Figs. 1 and 2. Also, such coil is wound around bin 100 in the manner described in connection with Fig. 1. An auxiliary ice-storage bin 101 is provided and has a duct 102 connecting it with bin 100.

The present embodiment provides refrigerating means including a liquid line LL from the condenser to the expansion valve 22 to the evaporator feed line 23 which leads to the jacket of freezing coil FC. A suction line SL circulates the vapors from the top of the freezing coil FC through the jacket of a tank 103, which serves as a pre-cooling tank, and thence returns the vapors to the compressor. Tank 103 can be similar in construction to metering tank MT shown in Fig. 3 except that piston 51 and screw 93 is omitted.

A line HGL again provides defrosting means by leading hot gases from the compressor directly to two points, 23a and 60, of the freezing coil FC.

Pressure water and circulating water are supplied to the freezing tube 21 through the same line PWL. Pressure water from the city main passes through a solenoid valve 50 into the pre-cooling tank 103, and passes from the bottom of the tank into the freezing tube 21 to be frozen.

Means for providing a continuous trickle of circulating water includes a capillary tube 109 connected at each end 110 and 111 to the pressure water line PWL and by-passing the solenoid valve 50. This tube has a small bore with an inside diameter of, for example, approximately .031" and has a length relatively long, e. g. approximately 20 feet. The capillary tube may be coiled for compactness. A gain in economy will result if the coil is placed in the cooled space surrounding the freezing coil FC or if it is placed so as to be chilled by drainage water or drippings from the cooled space.

With this construction, circulating water continuously flows through the line PWL and through the center of the ice rod being frozen to serve the same functions as previously described. By controlling the flow of the circulating water with the capillary tube, the use of needle valves to choke down flow is avoided. This is advantageous because needle valves are subject to clogging as their orifice must be smaller than .015" in diameter to accomplish the desired retriction of circulating water flow. The capillary tube is also cheaper than most valves which may be used, it passes larger pieces of sediment than such valves, and it is not susceptible to tampering.

It will be noted that the embodiment of Figs. 8 and 9 need not include the heat exchanger HE or the coiled loops of line CWL of Figs. 1 and 2.

In this embodiment, means responsive to a change in pressure of the circulating water are provided to open and close a valve connected in the pressure water inlet and to activate and deactivate the defrosting means. Thus, a pressure switch 115 for controlling the two solenoid valves 50 and 56 is connected directly to line PWL just past the valve 50 and ahead of the inlet to the freezing tube. The alternative control circuit, shown in Fig. 7, is energized when the freezing progresses to the point that pressure in the circulating water system is raised high enough to close the pressure switch 115. Closing of this switch energizes both solenoid valves 50 and 56 to initiate the ice harvesting cycle. As in the previously described embodiment, the valve 56 admits hot gases to defrost the freezing coil jacket and free the ice rod and valve 50 admits pressure water to discharge the ice rod. Upon discharge of the ice rod from the freezing tube, the water pressure will fall and open the pressure switch 115 to de-energize the solenoid valves and permit them to close. With this control means, the timing motor M and cams 81, 83 and 85 as well as metering tank MT are eliminated.

Deflecting means and guide members for the ice are provided as described in the previous embodiment. The guide members 72 are disposed so as to direct the ice cubes across the storage bin 100, through the duct 102 and across the auxiliary bin 101 to hit a curved target 121 mounted in the auxiliary bin. This travel of the ice cubes is made possible by the city water pressure discharging the ice rod from the freezing tube. At first the ice moves slowly, then faster and faster until a substantial portion of the ice cubes emerge as from a machine gun. Thus, a good portion of the ice cubes are directed against the target 121 which disperses them throughout the auxiliary bin 101. As the auxiliary bin becomes filled to the top, the ice cubes in it block the connecting duct 102 and no more can enter. All the fresh ice now falls instead into storage bin 100. The duct 102 may be flared on the auxiliary storage bin side to ensure that any ice lodged within the duct will fall through and re-open it as soon as the ice level within the bin has fallen by removal of ice.

A thermostatic bulb 125 may be provided near the top of the storage bin 100 and serves as a means of stopping the compressor 12 of this machine, e. g. by means of a temperature responsive switch 126, whenever the ice in the bin 100 accumulates high enough to cool the bulb below a certain point. When the ice level falls, the bulb warms up and initiates the starting of the compressor again.

A safety switch 130 may also be provided and acts to shut down the compressor any time the city water pressure falls too low.

In Figs. 10 and 11 is shown a very efficient and simple means of transporting ice cubes from the discharge end of a freezing tube to a bin situated remotely therefrom so that a plurality of ice-storage bins can be successively filled and such means can, of course, replace the corresponding ones shown in Figs. 1 and 2 or 8 and 9, if desired. Thus, the tops or other entries into one or more ice bins 150 and 151 are connected to the discharge end of the freezing tube by a member, preferably a shelf or plate 152, which is shown in the drawings as being flat and providing a pathway 153 past bin 150 to bin 151. This pathway can in part be defined by a back-plate 152a and receives ice cubes from freezing tube FC. Tube FC can extend through the plate to position ice breaker 70 and fingers 72 at a level slightly above that of plate 152 so that ice cubes traveling along the fingers are projected onto pathway 153 to slide, roll or bounce thereacross into bin 151. As soon as bin 151 fills, ice cubes will accumulate on pathway 153 until newly ejected cubes rebound therefrom into bin 150. The latter can be supplied with an automatic level control such as a thermostatic bulb arranged and connected as described with reference to Figs. 8 and 9.

An opening 152b and splash guard 152c are provided to direct water flowing from the freezing tube or flung from the ice cubes as they travel along fingers 72, into pan 43 from whence the water flows through line CWD for heat exchange with the warmer circulating water in line CWL.

Plate 152 is preferably made of a material offering very low resistance to ice cubes sliding thereacross. Stainless steel sheet is one example of such material. The plate can be inclined downwardly, if desired, in the direction taken by the ice cubes in traveling toward the most remote bin but such inclination should be limited to a minimum in order not to substantially decrease the effective depth of the remote bin.

The arrangement of plate 152 and bins 150 and 151 is, of course, advantageous whether the other construction of the freezing apparatus is as in Figs. 1 and 2 or 8 and 9 or various combinations of features of each. It is particularly advantageous for use when the available pressure of water for ejecting the ice rod is low (e. g. 10–15 p. s. i.) since the ice cubes can be readily moved horizontally for a considerable distance across the plate even when their initial velocity is quite low. The arrangement is also relatively simple and yet affords maximum utilization of bin capacity. It will be understood that the arrangement of Fig. 11 omits a showing of an insulating cabinet which is preferably employed to enclose the entire unit and which can be easily provided by one skilled in the art, as for example, by providing one similar to that shown in outline in Figs. 1 and 2.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

This application is a continuation-in-part of our copending application, Serial No. 357,492, filed May 26, 1953, now abandoned.

The invention having been described, what is claimed is:

1. A liquid freezing machine which comprises, in combination, a freezing tube, means for refrigerating said tube to freeze a liquid therein into a frozen core, and means for supplying liquid to be frozen to said tube and for discharging said core from said tube including a connection to the tube for supplying liquid to be frozen under pressure to move the core along and out of said tube and at the same time to substantially fill said tube with liquid to be frozen, valve means in said connection and controlling flow of said liquid into said tube, said connection between said valve means and the tube being sufficiently unrestricted that said liquid flows into said tube at a rate at least as great as that at which the core is ejected from the tube so that the liquid pushes the core from the tube, control means operable to open said valve means when said core is to be ejected from said tube and to hold the valve means in open position until said core is ejected by said liquid and then to close said valve means to substantially stop the flow of said liquid into said tube upon ejection of said core and upon substantially filling the tube with the liquid to be frozen, and core breaking means disposed to be engaged by the core as it is ejected from the tube and operable to crack the core into pieces by utilizing the force exerted on the core by the liquid ejecting the same, said valve means comprising a means adapted to meter a predetermined quantity of said liquid into said tube and then to substantially stop flow thereinto and including a vessel having an outlet in fluid communication with said liquid supply connection to said tube and an inlet spaced from said outlet, said vessel also including a part movable from said inlet toward said outlet while limiting flow of liquid past itself.

2. The machine of claim 1 wherein said part comprises a piston slidable along said vessel and providing a restricted fluid communication between its ends so that liquid flowing through said inlet will push the piston along the vessel thereby forcing a predetermined quantity of liquid ahead of the piston through said outlet and upon cessation of flow through said inlet, pressure across said piston will equalize to permit the piston to move toward said inlet.

3. The machine of claim 1 wherein said meter means has heat exchange means associated therewith to precool liquid within said meter means, and a connection between said heat exchange means and said refrigerating means for passing refrigerant through the heat exchange means.

4. A liquid congealing machine comprising a coiled freezing tube, a line for supplying liquid under pressure to the inside of the tube adjacent the lower end of the tube, a normally closed valve in the supply line, refrigerating means for refrigerating said tube to freeze the liquid therein, means for defrosting said tube, a system connected to the tube to circulate a predetermined small quantity of fluid therethrough while the tube is being refrigerated, and means responsive to a change in pressure in the circulating fluid passing to the tube for opening said valve.

5. A device as set forth in claim 4 in further combination with a control for said defrost means normally rendering the defrost means inactive, said pressure responsive means also actuating said control to activate said defrost means upon a change in pressure of said circulating fluid.

6. A device as set forth in claim 4 wherein said circulating fluid system includes a capillary tubing connected in the supply line by-passing said valve thereby providing a continuous trickle of circulating water through the freezing tube.

7. A device as set forth in claim 4 wherein said circulating fluid system has its inlet connected to said tube at a point spaced longitudinally along said tube from that of said line to said tube so that circulating fluid flows through only a portion of the effective length of said tube to permit a solid plug of congealed liquid to form in at least a portion of the remainder of the tube.

8. Liquid congealing and storing apparatus comprising a storage bin, a freezing tube coiled around the storage bin and arranged to receive liquid to be congealed, refrigerating means associated with the freezing tube, means for discharging a congealed core formed in the freezing tube, means for breaking the congealed core into pieces upon its discharge from the tube, guide members for directing the pieces across the storage bin, an auxiliary storage bin having a duct connecting it with the first mentioned storage bin, said guide members having end portions extending toward the duct to direct the pieces through said duct whereby the auxiliary storage bin is substantially filled up before the first mentioned bin.

9. The apparatus of claim 8 in combination with control means responsive to the temperature near the top of the first mentioned storage bin, said refrigerating means including a compressor, said control means being operative to shut off the compressor when said temperature drops to a predetermined level due to the accumulation of said pieces in the first mentioned storage bin.

10. Liquid congealing and storing apparatus comprising a storage bin, a freezing tube coiled around the storage bin and arranged to receive water thereinto at its lower end, means for refrigerating the freezing tube, said refrigerating means also refrigerating said bin, and means situated at the discharge end of said tube for breaking the congealed liquid into pieces upon its discharge from the tube and deflecting the pieces into said bin.

11. A device as set forth in claim 10 in further combination with a member extending from said breaking means to an inlet to said bin and providing a smooth pathway along which ejected pieces of said congealed fluid slide into said bin, said member being of a material having low resistance to said pieces sliding thereacross.

12. A device as set forth in claim 10 further comprising control means responsive to the temperature near the top of said storage bin, said refrigerating means including a compressor, and said control means being operative to shut off the compressor.

13. Liquid congealing apparatus which comprises, in combination, first and second storage bins, a freezing tube coiled around the first bin and arranged to receive liquid to be congealed thereinto adjacent its lower end, means for refrigerating the freezing tube, said refrigerating means also refrigerating said first bin, breaking means situated at the discharge end of said tube to break the congealed liquid into pieces upon its discharge from said tube, a member interconnecting inlets to the first and second bins with said breaking means and providing a smooth pathway along which ejected ones of said pieces slide, said inlet to the first bin being disposed laterally to one side of said pathway so that said pieces slide along said pathway past said first bin inlet to first fall into said second bin and upon filling the second bin to its inlet accumulate along said pathway between the first and second bins to deflect succeeding pieces into the first bin.

14. The apparatus of claim 13 in combination with substantially parallel curved fingers situated to receive pieces of congealed liquid ejected from said breaking means and to deflect the pieces thus ejected to travel in a direction differing from that in which they were ejected from the breaking means and along said pathway.

15. Liquid congealing apparatus which comprises, in combination, a coiled freezing tube having a connection for introducing a liquid to be frozen into the tube at a point remote from the tube's discharge end, means for refrigerating said tube to congeal liquid therein into a core, means for defrosting said tube, means for ejecting said core from the tube, a breaker situated at the outlet of the tube to break the core into pieces as the core is ejected and means for deflecting the resulting pieces from their path after ejection.

16. The apparatus of claim 15 wherein said deflecting means comprises substantially parallel curved fingers situated to receive the pieces ejected from the breaker and to deflect the pieces to travel in a direction differing from that in which they were ejected from the breaker.

17. The apparatus of claim 15 wherein said breaker comprises a length of tube situated at the outlet of said freezing tube and having a curvature different from that of said freezing tube whereby the core in passing through the breaker tube will be broken into pieces.

18. The apparatus of claim 17 wherein said deflecting means comprises parallel curved fingers connected at one of their ends to said breaker tube to receive said pieces, said fingers being laterally spaced from each other.

19. A congealed liquid making apparatus which comprises, in combination, a coiled freezing tube disposed about a frozen product storage bin, said tube being of substantially uniform curvature about a central longitudinal axis, means for refrigerating said tube, means for defrosting said tube, a connection for introducing liquid to be frozen into said tube, a valve in said connection, means for passing circulating fluid through said tube, means responsive to an increase in pressure of said circulating fluid to open said valve and to close said valve responsive to a decrease in circulating fluid pressure, said pressure responsive means also energizing said defrosting means when said valve is opened and de-energizing said defrosting means when said valve is closed, a congealed liquid breaker at the outlet of said tube, and guide members situated to receive broken pieces from said breaker and to guide the same toward said bin.

20. In an ice making apparatus wherein means are provided for passing a refrigerant through a jacket on a tube to freeze liquid in the tube into a frozen rod and wherein means are provided for thawing the frozen rod from the tube so that the rod can be ejected, the combination therewith of means including a connection to a lower portion of the tube for supplying liquid to be frozen under pressure to said tube to move the rod along and out of the tube and at the same time re-fill the tube with liquid to be frozen, and means for circulating liquid through the tube while the rod is being frozen including an inlet to said tube for said circulating liquid, said inlet being spaced adjacent to said connection but intermediate the ends of said jacket whereby a solid plug of liquid is frozen in the portion of the tube between said inlet and connection so that said liquid to be frozen can act against the plug to move the rod out of the tube.

21. Liquid congealing and storing apparatus comprising a storage bin, a freezing tube coiled around the storage bin and arranged to receive liquid to be congealed, refrigerating means associated with the freezing tube, means for discharging a congealed core formed in the freezing tube, means for breaking the congealed core into pieces upon its discharge from the tube, the arrangement being such that the pieces from said breaking means pass into said bin.

22. The apparatus of claim 21 in combination with an auxiliary storage bin, and means directing said pieces into one of said storage bins until the same is filled to a desired level, the other storage bin being arranged to receive said pieces after said one storage bin is so filled.

23. A liquid congealing machine comprising a freezing tube, a connection for supplying liquid under pressure to the inside of the tube adjacent one end of the tube, a normally closed valve in the supply connection, refrigerating means for refrigerating said tube to freeze the liquid therein, means for defrosting said tube, a system connected to the tube to circulate a predetermined small quantity of liquid therethrough while the tube is being refrigerated, and pressure sensitive means exposed to the pressure of the circulating liquid passing to the tube and operable to open said valve responsive to a change in said pressure.

24. A liquid freezing machine which comprises, in combination, a freezing tube, means for refrigerating said tube to freeze a liquid therein into a frozen core, and means for supplying liquid to be frozen to said tube and for discharging said core from said tube including a connection to the tube for supplying liquid to be frozen under pressure to move the core along and out of said tube and at the same time to substantially fill said tube with liquid to be frozen, valve means in said connection and controlling flow of said liquid into said tube, said connection between said valve means and the tube being sufficiently unrestricted that said liquid flows into said tube at a rate at least as great as that at which the core is ejected from the tube so that the liquid alone pushes the core from the tube, pressure sensitive control means exposed to the pressure of liquid flowing to said tube through said connection and connected to said valve means and operable to open said valve means when said core is to be ejected from said tube and to hold the valve means in open position until said core is ejected by said liquid and then, substantially immediately after the core is ejected, to close said valve means to substantially stop the flow of said liquid into said tube, and core breaking means disposed to be engaged by the core as it is ejected from the tube and operable to crack the core into pieces by utilizing the force exerted on the core by the liquid ejecting the same.

25. A liquid freezing machine which comprises, in combination, a coiled freezing tube of substantially uniform curvature, means for refrigerating the exterior of said tube to freeze a liquid therein into a frozen rod, and means for supplying liquid to be frozen to said tube and for discharging said rod from said tube including a connection to the tube for supplying liquid to be frozen under pressure to a lower portion of said tube to move the rod along and out of said tube and at the same time to substantially fill said tube with liquid to be frozen, valve means for controlling flow of said liquid into said tube, and control means operable to open said valve means when said rod is to be ejected from said tube and to hold the valve means in open position until said core is ejected by said liquid and then to close said valve means to substantially stop the flow of said liquid into said tube upon ejection of said rod and upon substantially filling the tube with the liquid to be frozen.

References Cited in the file of this patent

UNITED STATES PATENTS

| | | |
|---|---|---|
| 150,477 | Martin | May 5, 1874 |
| 191,256 | Riker | May 29, 1877 |
| 1,928,212 | Salto | Sept. 26, 1933 |
| 1,966,150 | Tamm | July 10, 1934 |
| 2,145,773 | Muffly | Jan. 31, 1939 |
| 2,422,772 | Bohn | June 24, 1947 |
| 2,511,582 | Grindrod | June 13, 1950 |
| 2,542,891 | Bayston | Feb. 20, 1951 |
| 2,580,627 | Watkins | Jan. 1, 1952 |
| 2,595,588 | Lee | May 6, 1952 |
| 2,597,008 | Lee | May 20, 1952 |
| 2,633,004 | Leeson | Mar. 31, 1953 |
| 2,639,594 | Watt | May 26, 1953 |
| 2,648,956 | Fletcher | Aug. 18, 1953 |